(12) United States Patent
Roberts

(10) Patent No.: US 10,862,809 B2
(45) Date of Patent: Dec. 8, 2020

(54) MODIFYING CARRIER PACKETS BASED ON INFORMATION IN TUNNELED PACKETS

(71) Applicant: Advanced Micro Devices, Inc., Sunnyvale, CA (US)

(72) Inventor: David A. Roberts, Wellesley, MA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 202 days.

(21) Appl. No.: 15/600,048

(22) Filed: May 19, 2017

(65) Prior Publication Data

US 2018/0337863 A1    Nov. 22, 2018

(51) Int. Cl.
| H04L 12/833 | (2013.01) |
| H04L 12/46 | (2006.01) |
| H04L 12/851 | (2013.01) |
| H04L 12/28 | (2006.01) |
| H04L 12/723 | (2013.01) |

(52) U.S. Cl.
CPC ...... *H04L 47/2458* (2013.01); *H04L 12/4633* (2013.01); *H04L 47/2433* (2013.01); *H04L 12/28* (2013.01); *H04L 45/50* (2013.01)

(58) Field of Classification Search
CPC . H04L 47/2458; H04L 47/2433; H04L 47/32; H04L 47/62175; H04L 47/10; H04L 12/4633; H04L 12/28; H04L 45/22; H04L 45/50; H04L 29/06; H04L 29/0653; H04L 29/08072; H04L 12/833; G06Q 10/107
USPC ........... 709/230, 207, 240, 239, 236; 726/13
See application file for complete search history.

(56) References Cited

U.S. PATENT DOCUMENTS

| 6,546,017 B1 * | 4/2003 | Khaunte | H04L 47/15 370/412 |
| 7,760,636 B1 * | 7/2010 | Cheriton | H04L 12/4633 370/235 |
| 7,961,623 B2 * | 6/2011 | Riley | H04L 65/80 370/236 |
| 8,266,677 B2 * | 9/2012 | Wesemann | H04L 63/0272 726/4 |
| 8,300,575 B2 * | 10/2012 | Willars | H04L 47/2491 370/328 |
| 8,966,240 B2 * | 2/2015 | Chopra | H04L 12/462 713/150 |
| 9,059,926 B2 * | 6/2015 | Akhter | H04L 41/142 |
| 9,331,920 B2 * | 5/2016 | Nedeltchev | H04L 63/0272 |
| 9,386,023 B2 * | 7/2016 | MacDonald | H04L 63/102 |
| 2007/0008934 A1 * | 1/2007 | Balasubramanian | H04L 69/14 370/335 |
| 2007/0147378 A1 * | 6/2007 | Elgebaly | H04L 63/0272 370/392 |

(Continued)

*Primary Examiner* — Saleh Najjar
*Assistant Examiner* — Khalid M Almaghayreh
(74) *Attorney, Agent, or Firm* — Park, Vaughan, Fleming & Dowler LLP

(57) ABSTRACT

The described embodiments include an electronic device that handles network packets. During operation, the electronic device receives a carrier packet, the carrier packet that includes a tunneled packet in a payload of the carrier packet, wherein the tunneled packet includes a packet priority of the tunneled packet and the carrier packet includes a packet priority of the carrier packet. The electronic device then updates the packet priority of the carrier packet based on the packet priority of the tunneled packet.

20 Claims, 7 Drawing Sheets

(56) References Cited

U.S. PATENT DOCUMENTS

| | | | |
|---|---|---|---|
| 2008/0020775 A1* | 1/2008 | Willars | H04L 47/2441 455/445 |
| 2008/0080533 A1* | 4/2008 | Yamane | H04L 12/4641 370/401 |
| 2012/0300630 A1* | 11/2012 | Abel | H04L 69/22 370/235 |
| 2014/0323137 A1* | 10/2014 | Graffagnino | H04W 8/06 455/445 |
| 2017/0359268 A1* | 12/2017 | Chan | H04L 1/08 |
| 2017/0373883 A1* | 12/2017 | Guo | H04W 48/20 |

* cited by examiner

MODIFYING CARRIER PACKETS BASED ON INFORMATION IN TUNNELED PACKETS

BACKGROUND

Related Art

Some electronic devices support tunneling, for which "tunneled" network packets are incorporated in payloads of "carrier" network packets for communication via an electronic network. For example, in some electronic devices, tunneled packets of a first protocol (e.g., I2C) may be entirely incorporated within payloads of carrier packets of a second protocol (e.g., Ethernet). Using tunneling, the electronic devices can, for example, enable the communication of packets/protocols that otherwise may not be communicated via the network.

In some cases, information in tunneled packets can be ignored and/or unused once the tunneled packets are incorporated into the payload of carrier packets. For example, tunneled packets may include packet priority information that would ordinarily be used by network equipment (e.g., switches, routers, receiving electronic devices, etc.) to determine levels of service, processing order (e.g., with respect to other packets, etc.), and/or other types of handling or control configurations for the tunneled packets. Once tunneled packets are included in the payloads of carrier packets, however, such information is ignored by the network equipment. The network equipment instead uses information from the carrier packets, which may differ from the corresponding information in the tunneled packets. Continuing the example above, instead of using packet priority information from tunneled packets, the network equipment uses packet priority information from carrier packets. Because the packet priority information may be different, the network equipment may perform different processing for the carrier packet (i.e., a lower level of service, etc.) than would be performed for the tunneled packet.

BRIEF DESCRIPTION OF THE FIGURES

Throughout the figures and the description, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Terminology

In the following description, various terms are used for describing embodiments. The following section provides simplified and general descriptions of one of these terms. Note that the term may have significant additional aspects that are not recited herein for clarity and brevity and thus the description is not intended to limit the term.

Figure 1:
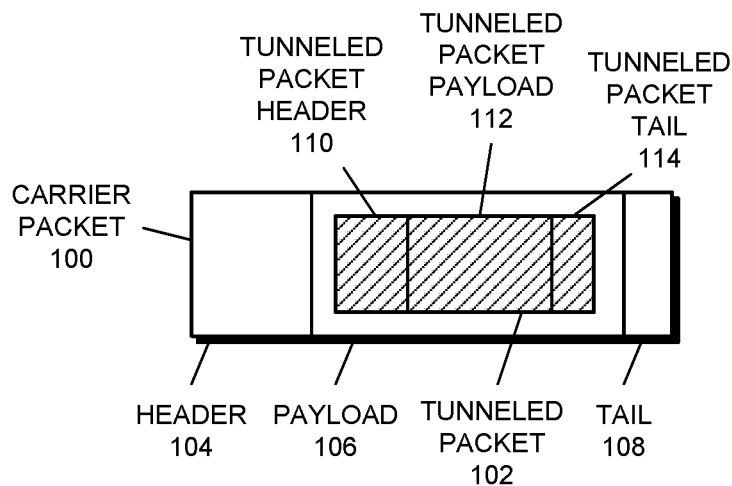
FIG. 1 presents a block diagram illustrating a carrier packet that includes, in a payload of the carrier packet, a tunneled packet in accordance with some embodiments.

Tunneling: tunneling is a term describing the incorporation of "tunneled" packets into the payloads of "carrier" packets for communication on wired and/or wireless networks. For tunneling, when preparing to transmit a tunneled packet to a receiving device, at a specified level (or levels) of a network protocol stack, e.g., at the Internet layer of the Internet Protocol (IP), a transmitting device "wraps" the tunneled packet in a carrier packet. In other words, the transmitting device entirely includes the tunneled packet in the payload of the carrier packet. FIG. 1 presents a block diagram illustrating a carrier packet that includes, in its payload, a tunneled packet in accordance with some embodiments. As can be seen in FIG. 1, carrier packet 100 includes carrier packet 100's own header 104, payload 106, and tail 108. Within carrier packet 100's payload 106, the entire tunneled packet 102 is incorporated, including tunneled packet header 110, tunneled packet payload 112, and tunneled packet tail 114. Once the tunneled packet has been included in the payload of the carrier packet, the transmitting device transmits the carrier packet to the receiving device via the network, thereby communicating the tunneled packet within the carrier packet to the receiving device. In some embodiments, tunneled packets are packets that would not otherwise be able to be communicated directly on the wired or wireless network, such as when the tunneled packets are formatted according to a protocol that is not configured to be communicated on the network.

Overview

In the described embodiments, electronic devices (e.g., computers, switches, routers, etc.) support tunneling for packets. As described above, for tunneling, tunneled packets are incorporated within payloads of carrier packets for communication on wired and/or wireless network. The described embodiments perform operations for modifying information in carrier packets based on information in tunneled packets. For example, in some embodiments, network equipment (e.g., routers, switches, receiving devices, etc.) modifies the carrier packets by updating packet priorities for carrier packets based on packet priorities for tunneled packets. In these embodiments, upon receiving a packet, a piece of network equipment determines if a tunneled packet is located in the payload of the packet—and thus the packet is a carrier packet. If so, the piece of network equipment acquires a packet priority of the tunneled packet, e.g., from a header of the tunneled packet in the payload of the carrier packet. The piece of network equipment then updates the packet priority of the carrier packet based on the packet priority of the tunneled packet.

In some embodiments, a priority mapping table is used to determine, based on the tunneled packet priority, a priority update value to be used to update the carrier packet priority. The priority mapping table includes a number of entries (e.g., 3, 8, etc.), each entry including a priority update value associated with a corresponding different packet priority of a tunneled packet. In these embodiments, determining the priority update value involves using a tunneled packet priority to acquire, from the priority mapping table, a corresponding priority update value.

In some embodiments, a packet priority algorithm is used to determine, based on the tunneled packet priority, a priority update value to be used to update the carrier packet priority. The packet priority algorithm can be or include an expression, routine, or computation that includes one or more mathematical, logical, bitwise, and/or other operations. When performed on/using the tunneled packet priority value and possibly one or more other values (e.g., input values, control/bias values, multipliers/divisors, etc.), the packet priority algorithm generates, as a result, the priority update value.

In some embodiments, the above-described priority mapping table and/or packet priority algorithm can be dynamically updated, i.e., updated during runtime, after a startup operation, etc. For example, an update for the priority mapping table may include updates one or more entries in the priority mapping table. As another example, the packet priority algorithm may be wholly or partially replaced or updated, e.g., to include additional or new operations, multipliers/divisors, etc. In this way, the priority mapping table and/or packet priority algorithm can be updated to control the flow of network traffic from corresponding network equipment.

In some embodiments, network equipment receives, and may temporarily buffer or store, the entire carrier packet before updating the packet priority of the carrier packet based on a packet priority of the tunneled packet. In these embodiments, the carrier packet is then transmitted to a receiving device with the packet priority of the carrier packet already updated and current.

In some embodiments, a portion of the carrier packet that includes an indication of the packet priority of the carrier packet, e.g., a header of the carrier packet, is transmitted—or "eagerly" transmitted—to a receiving device before a remaining portion of the carrier packet. In these embodiments, the packet priority of the tunneled packet and/or the priority update value can be unknown or unresolved until after the portion of the carrier packet is transmitted. To update the packet priority of the carrier packet in this case, a piece of network equipment causes the receiving device to update the packet priority of the carrier packet. For example, in some embodiments, upon determining the packet priority of the tunneled packet, the piece of network equipment sets a value in a tail of the carrier packet to indicate the update to be made to the packet priority of the carrier packet based on the packet priority of the tunneled packet. In these embodiments, based on the value in the tail of the carrier packet, the receiving device updates, in the receiving device, the packet priority of the carrier packet. As another example, in some embodiments, upon determining the packet priority of the tunneled packet, the network equipment causes the receiving device to abort, in the receiving device, the receiving of the carrier packet. The piece of network equipment then updates the packet priority of the carrier packet based on a packet priority of the tunneled packet, and retransmits the carrier packet to the receiving device.

By updating packet priorities of carrier packets based on packet priorities of tunneled packets as described herein, the described embodiments improve the performance of network equipment. More specifically, the described embodiments ensure that packet priorities for tunneled packets are used when handling/processing corresponding carrier packets in network equipment such as switches, routers, and receiving devices—resulting in carrier packets, and the tunneled packets included therein, being more appropriately handled by network equipment. This can reduce or eliminate unnecessarily low-priority or high-priority handling of the carrier packets, which can increase network equipment performance, with a corresponding increase in user satisfaction.

System

Figure 2:
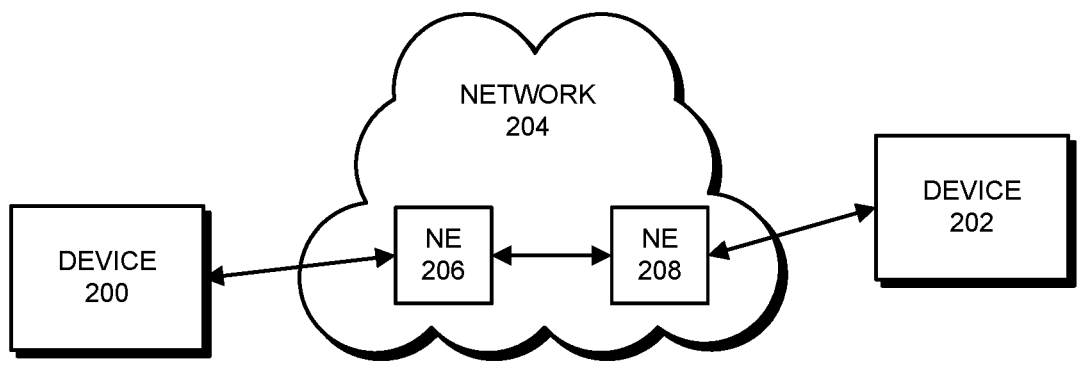
FIG. 2 presents a block diagram illustrating devices coupled to a network in accordance with some embodiments.

FIG. 2 presents a block diagram illustrating devices 200 and 202 coupled to a network 204 in accordance with some embodiments. Devices 200 and 202 are electronic devices that include networking subsystems for coupling to/joining and communicating on a wired and/or wireless network. For example, devices 200 and 202 may each be a computer, a smart phone or a smart device, an entertainment device, etc. In these embodiments, network 204 is a wired and/or wireless network such as an Ethernet network, a cellular networking system (e.g., a 5G/4G network such as UMTS, LTE, etc.), a universal serial bus (USB) networking system, a wireless local area networking (WLAN) system (e.g., a WLAN system based on the standards described in IEEE 802.11 such as a Wi-Fi® networking system), etc. In some embodiments, network 204 includes the Internet and/or an intranet. Network equipment ("NE") 206 and 208 are electronic devices that receive and transmit network packets on network 204, i.e., communication packets configured according to a corresponding protocol. For example, network equipment 206 and 208 can be routers, switches, modems, etc. that perform operations for receiving and forwarding packets, directing packets, etc. In some embodiments, devices 200 and/or 202 and/or network equipment 206 and/or 208 perform operations for modifying carrier packets (e.g., packet priorities of carrier packets, etc.) based on information in tunneled network packets in the payloads of the carrier packets as described herein. IEEE 802.11 (e.g., a Wi-Fi networking system), etc. In some embodiments, network 204 includes the Internet and/or an intranet. Network equipment ("NE") 206 and 208 are electronic devices that receive and transmit network packets on network 204, i.e., communication packets configured according to a corresponding protocol. For example, network equipment 206 and 208 can be routers, switches, modems, etc. that perform operations for receiving and forwarding packets, directing packets, etc. In some embodiments, devices 200 and/or 202 and/or network equipment 206 and/or 208 perform operations for modifying carrier packets (e.g., packet priorities of carrier packets, etc.) based on information in tunneled network packets in the payloads of the carrier packets as described herein.

Figure 3:
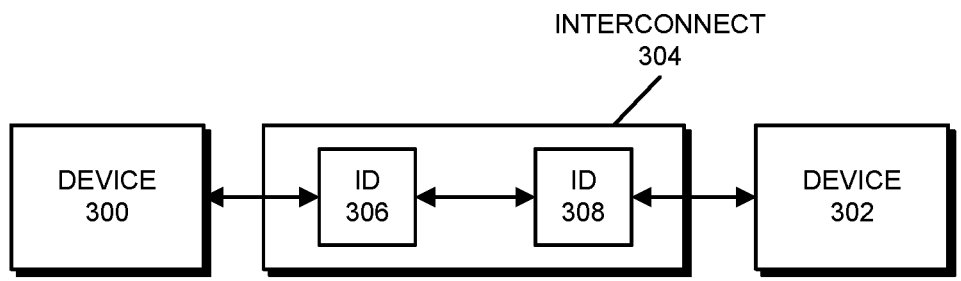
FIG. 3 presents a block diagram illustrating devices coupled to an interconnect in accordance with some embodiments.

Although an embodiment with devices 200 and 202 and network 204 is presented in FIG. 2, in some embodiments, the system is arranged differently. For example the network may be and/or include an interconnect between functional blocks or elements. FIG. 3 presents a block diagram illustrating devices 300 and 302 coupled to an interconnect 304 in accordance with some embodiments. In some embodiments, devices 300 and 302 are functional blocks or elements such as central processing units (CPUs) or CPU cores, graphics processing units (GPUs), application-specific integrated circuits, embedded processors, etc. In these embodiments, interconnect 304 is a communication path coupled between devices 300 and 302 (e.g., a serial or parallel bus comprising one or more wires, guides, etc.). Interconnect devices ("ID") 306 and 308 are functional blocks or elements that handle receiving and transmitting communication packets on interconnect 304, i.e., communication packets configured according to a corresponding protocol. For example, interconnect devices 306 and 308 can be bus interfaces, etc. that perform operations for receiving and forwarding packets, directing packets, etc. In some embodiments, devices 300 and/or 302 and/or interconnect devices 306 and/or 308 perform operations relating to modifying carrier packets (e.g., packet priorities of carrier packets, etc.) based on information in tunneled network packets in the payloads of the carrier packets as described herein.

Although FIGS. 2-3 present particular arrangements of devices and a network or interconnect, in some embodiments, the devices and/or network or interconnect is arranged differently. Generally, the described embodiments include at least one piece of network equipment, interconnect device, and/or other device that performs operations for modifying carrier packets (e.g., packet priorities of carrier packets, etc.) based on information in tunneled network packets in the payloads of the carrier packets as described herein.

Figure 4:
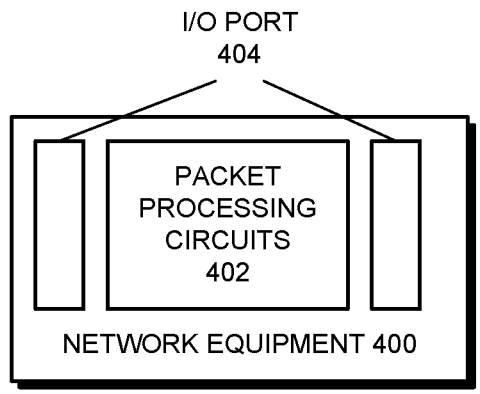
FIG. 4 presents a block diagram illustrating a piece of network equipment in accordance with some embodiments.

FIG. 4 presents a block diagram illustrating a piece of network equipment 400 in accordance with some embodiments. In some embodiments, some or all of network equipment 206 and 208 are arranged similarly to network equipment 400. In addition, although named differently, in some embodiments, some or all of interconnect devices 306 and 308 are arranged similarly to network equipment 400—in that the interconnect devices 306 and 308 can have similar internal functional blocks. As can be seen in FIG. 4, network equipment 400 includes packet processing circuits 402 and input-output (I/O) ports 404. Packet processing circuits 402 is a functional block that is configured to perform packet processing operations. The packet processing operations performed by packet processing circuits 402 depend on the purpose(s) and configuration of network equipment 400. For example, packet processing circuits 402 may perform operations of a packet switch, a router, a modem, an interconnect interface, etc.

Figure 5:
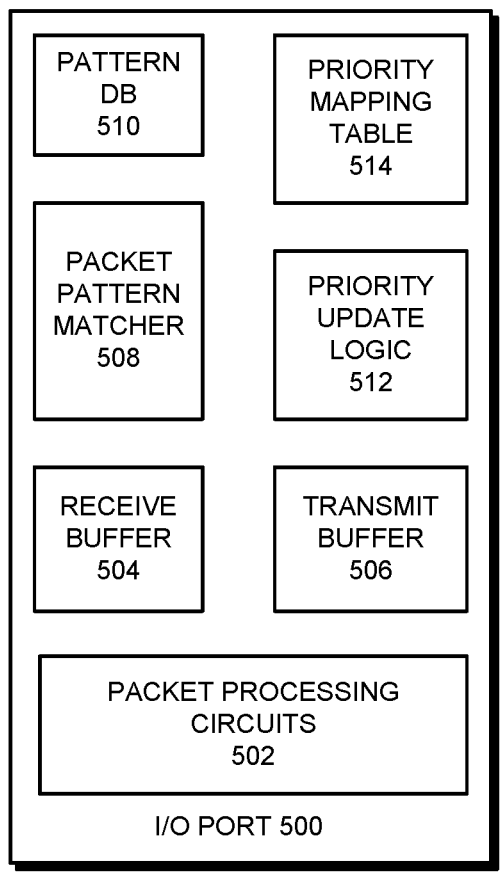
FIG. 5 presents a block diagram illustrating an input-output (I/O) port in accordance with some embodiments.

I/O ports 404 are communication ports on and by which network equipment 400 receives and transmits packets. FIG. 5 presents a block diagram illustrating an I/O port 500 in accordance with some embodiments. In some embodiments, one or both of I/O ports 404 are arranged similarly to I/O port 500. As can be seen in FIG. 5, I/O port 500 includes packet processing circuits 502, receive buffer 504, transmit buffer 506, packet pattern matcher 508, pattern database ("DB") 510, priority update logic 512, and priority mapping table 514. Packet processing circuits 502 is a functional block that is configured to perform operations generally relating to receiving and transmitting packets on a corresponding network. For example, packet processing circuits 502 may include transmit and receive circuits, interface circuits, packet handling circuits, packet fragmentation/reassembly circuits, packet encoders/decoders, packet filters, packet translators, and/or other circuits.

Receive buffer 504 and transmit buffer 506 are functional blocks that include memory elements for temporarily storing packets that are, respectively, received and transmitted by I/O port 500. In some embodiments, packets are stored in one or both of receive buffer 504 and transmit buffer 506 to enable operations such as modifying carrier packets based on information in tunneled network packets in the payloads of the carrier packets as described herein.

Packet pattern matcher 508 is a functional block that performs operations for determining if received packets include tunneled packets—and thus are carrier packets. During operation, when a packet is received (or perhaps when packets meeting one or more qualifications such as packet source, length, etc. are received), packet pattern matcher 508 checks some or all of the data in the payload of the packet to determine if a tunneled packet is included therein. For example, packet pattern matcher 508 may be programmed with or otherwise have access to one or more packet templates that are compared to or used to check some or all of the payload, i.e., one or more bytes of the payload, to determine if a match is found. For instance, each packet template may directly or indirectly indicate where a start and/or end of a header in a corresponding format of tunneled packet is to be located within the payload of a carrier packet, and/or may directly or indirectly indicate expected locations for one or more other features of the tunneled packet. As another example, each packet template may include one or more bits or bytes that are compared (bit-for-bit, byte-for-byte, etc.) to corresponding locations in the payload of a carrier packet to determine if the payload includes a tunneled packet. When a match is found, i.e., when there is a tunneled packet included in the payload of a carrier packet, packet pattern matcher 508 causes priority update logic 512 to perform an updating operation as described herein.

In some embodiments, packet pattern matcher 508 acquires the packet templates or otherwise refers to packet templates from a pattern database such as pattern database 510. Pattern database 510 is a functional block that includes memory elements that store one or more packet templates. For example, in some embodiments, pattern database 510 includes a number of entries, each entry including a template. In some embodiments, pattern database 510 is dynamically updateable, in that some or all of the packet templates in pattern database 510 can be replaced, overwritten, and/or changed during operation of I/O port 500.

As an alternative to, or in addition to, using the above-described packet templates, in some embodiments, packet pattern matcher 508 performs regular expression matching for, or searching of, some or all of the data in the payload of the packet to determine if a tunneled packet is included therein. Generally, for regular expression matching, packet pattern matcher 508 searches some or all of the data in the payload of the packet for one or more specified patterns of characters, strings, etc. In these embodiments, packet pattern matcher 508 may include a regular expression engine, processing circuit, or other mechanism for performing the regular expression matches.

Priority update logic 512 is a functional block that performs operations for updating a packet priority of a carrier packet based on a packet priority of a tunneled packet. Generally, updating the packet priority of the carrier packet involves replacing or otherwise adjusting, when appropriate, an original packet priority value for a carrier packet with a new priority value, thereby changing the packet priority of the carrier packet as the carrier packet is handled in network equipment, interconnect devices, and/or other devices or elements. For example, when a tunneled packet has a lower priority than a corresponding carrier packet, updating the packet priority of the carrier packet includes reducing the packet priority of the carrier packet. In this case, a packet priority value in a header of the carrier packet, or elsewhere in the carrier packet, may be reduced from a first value, e.g., "2," to a lower value, e.g., "3," with the lower value informing handling network equipment that the packet may be handled with a corresponding lower priority or quality of service—e.g., processed after one or more higher priority packets, placed in lower priority handling queues, delayed for longer times, transmitted on lower-priority branches of a network, etc. Operations relating to updating packet priority for carrier packets based on packet priority of tunneled packets are described in more detail below.

In some embodiments, priority update logic 512 is configured to acquire information for updating packet priorities of carrier packets from priority mapping table 514. For example, in some embodiments, priority mapping table 514 includes a number of entries, each entry including a mapping (i.e., translation, conversion, etc.) from a packet priority for tunneled packets to a corresponding packet priority for carrier packets. For instance, an entry in priority mapping table 514 may include a packet priority for tunneled packet field that has a value of a packet priority for a tunneled packet such as "1," "high," etc., and a second packet priority for carrier packet field that has a value of a packet priority for an associated carrier packet such as "011," "A," "high," etc. Acquiring the information from priority mapping table 514 includes performing a lookup or other comparison operation to find an entry with a corresponding value of a packet priority for a tunneled packet and returning the corresponding packet priority for a carrier packet.

In some embodiments, each possible packet priority for a tunneled packet has a separate entry in priority mapping table 514 and is associated with a separate packet priority for a carrier packet. In other embodiments, one or more entries in priority mapping table 514 is used for two or more packet priorities for tunneled packets, e.g., for a range of packet priorities of tunneled packets. In addition, one or more packet priorities for a tunneled packet may be associated with a same packet priority for a carrier packet. For example, there may be more packet priorities for tunneled packets than packet priorities for carrier packets, in which case two or more packet priorities for tunneled packets are associated with a same packet priority for carrier packets.

Although embodiments are described in which priority update logic 512 uses priority mapping table 514 for updating packet priorities of carrier packets, in some embodiments, a different or additional mechanism is used. In other words, priority mapping table 514 may be replaced or supplemented by one or more other mechanisms. For example, in some embodiments, priority update logic 512 is configured to use one or more packet priority algorithms for determining a priority update value for a carrier packet based on a packet priority for a tunneled packet. In these embodiments, the packet priority algorithm can include any number of mathematical, logical, bitwise, and/or other operations that generate, based on the tunneled packet priority value and one or more other values (e.g., control values, multipliers/divisors, constants, etc.), the priority update value as a result. Generally, the described embodiments include at least one mechanism for acquiring, computing, deriving, or otherwise determining a packet priority for a carrier packet based on a packet priority for a tunneled packet.

Although I/O port 500 is illustrated with various functional blocks, in some embodiments, I/O port 500 is arranged differently. For example, some or all of the functions attributed to I/O port 500 may be performed elsewhere—such as in a general-purpose processing circuit that configurably (via executing program code, firmware, etc.) performs all of the above-described operations or in a single/combined functional block with dedicated circuits that perform the above-described operations. Generally, in the described embodiments, network equipment 400 includes sufficient functional blocks to perform the operations herein described.

Updating a Packet Priority for a Carrier Packet

Figure 6:
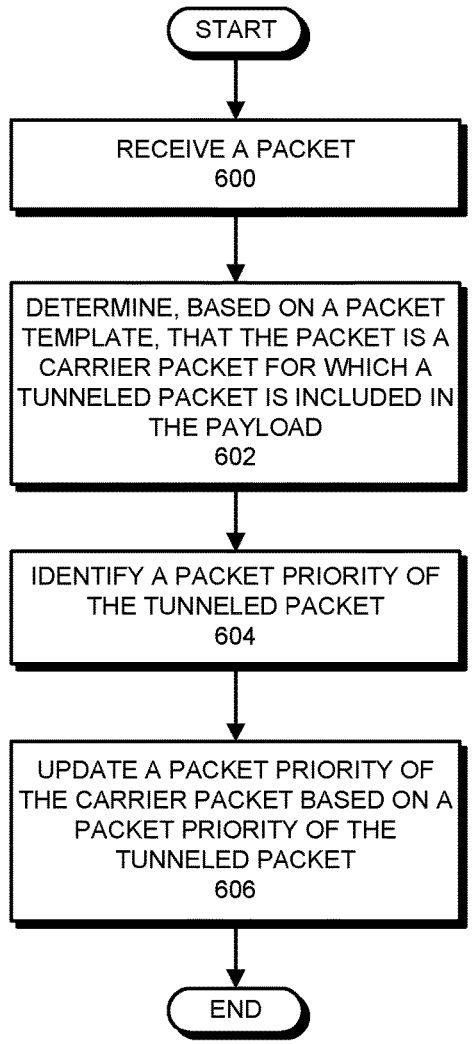
FIG. 6 presents a flowchart illustrating a process for updating a packet priority of a carrier packet based on a packet priority of a tunneled packet in accordance with some embodiments.

As described above, the described embodiments perform operations for updating a packet priority of a carrier packet based on a packet priority of a tunneled packet. FIG. 6 presents a flowchart illustrating a process for updating a packet priority of a carrier packet based on a packet priority of a tunneled packet in accordance with some embodiments. Note that the operations shown in FIG. 6 are presented as a general example of functions performed by some embodiments. The operations performed by other embodiments include different operations and/or operations that are performed in a different order. Additionally, although certain mechanisms are used in describing the process, in some embodiments, other mechanisms can perform the operations. For example, although an embodiment is described in which a piece of network equipment performs the operations, in some embodiments an interconnect device and/or another device performs the operations.

The process shown in FIG. 6 starts when a piece of network equipment (e.g., network equipment 206 or 208) receives a packet (step 600). For example, an I/O port (e.g., I/O port 404) of the piece of network equipment may receive, on a network interface, the packet from a remote sending device, such as a sending device coupled to a network with the piece of network equipment.

The piece of network equipment then determines, based on at least one packet template, that the packet is a carrier packet for which a tunneled packet is included in the payload (step 602). During this operation, a packet pattern matcher (e.g., packet pattern matcher 508) in the piece of network equipment uses at least one packet template (e.g. from pattern database 510) to determine if the received packet is a carrier packet. For example, for each packet template, the packet pattern matcher may compare a corresponding bit or byte patterns with bits or bytes in specified locations in the payload of the received packet to determine if there is a match between the bit or byte pattern and the bits or bytes in the specified locations in the payload of the received packet. For instance, given that a particular tunneled packet format is expected to have selected bits set in particular ways, the packet pattern matcher can check the value of corresponding bits in the received packet. As another example, for each packet template, the packet pattern matcher may determine whether the received packet includes, at a particular offset within the payload, one or more bits of a specified value.

In some embodiments, the at least one packet template includes a packet template for each tunneled packet format in a set or group of two or more permissible tunneled packet formats. In these embodiments, therefore, the packet pattern matcher determines, based on the packet templates, whether the received packet includes a tunneled packet formatted in accordance with any of the set or group of permissible tunneled packet formats.

In some embodiments, the determining operation may include additional checks or other operations to ensure that the tunneled packet is actually a tunneled packet, and thus the match with the packet template was not just a coincidence. For example, a length of the packet can be verified, a tail of the packet can be checked, a sender/source of the packet can be determined, a protocol of the received packet can be verified as supporting tunneled packets, and/or other checks can be performed.

In some embodiments, the packet pattern matcher includes a processing pipeline, and perhaps a multi-stage processing pipeline, that performs some or all of the determining operation. In some of these embodiments, the packet pattern matcher includes a pipeline for each of two or more packet templates, e.g., for tunneled packets of two or more respective formats or configurations. In embodiments with two or more pipelines, the determining operations may be performed in parallel for the respective two or more packet templates.

The piece of network equipment then identifies the packet priority of the tunneled packet (step 604). During this operation, the piece of network equipment, e.g., the packet pattern matcher or a priority update logic, based on a known format of the tunneled packet (e.g., determined using the packet template), acquires a value representing the packet priority of the tunneled packet from the payload of the received packet (which is known to be a carrier packet based on step 602). For example, in some embodiments, a set of N bits (where N is one or more), which indicate the packet priority of the tunneled packet, are acquired from a known location of the tunneled packet in the payload of the received packet.

Next, the piece of network equipment updates a packet priority of the carrier packet based on the packet priority of the tunneled packet (step 602). For this operation, the piece of network equipment updates the packet priority of the carrier packet in a header or elsewhere in the carrier packet so that a receiving device (i.e., downstream network equipment) processes the received packet using a packet priority for the carrier packet that reflects the packet priority of the tunneled packet—which may be different than an original packet priority of the carrier packet. The examples in FIGS. 7-8 illustrate several techniques for updating the packet priority of the carrier packet based on a packet priority of the tunneled packet.

Figure 7:
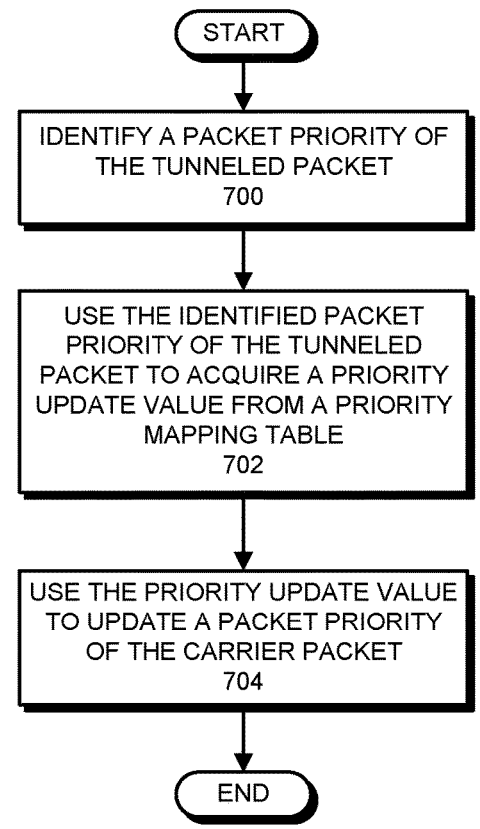
FIG. 7 presents a flowchart illustrating a process for using a priority mapping table for updating a packet priority of a carrier packet based on a packet priority of a tunneled packet in accordance with some embodiments.
Figure 8:
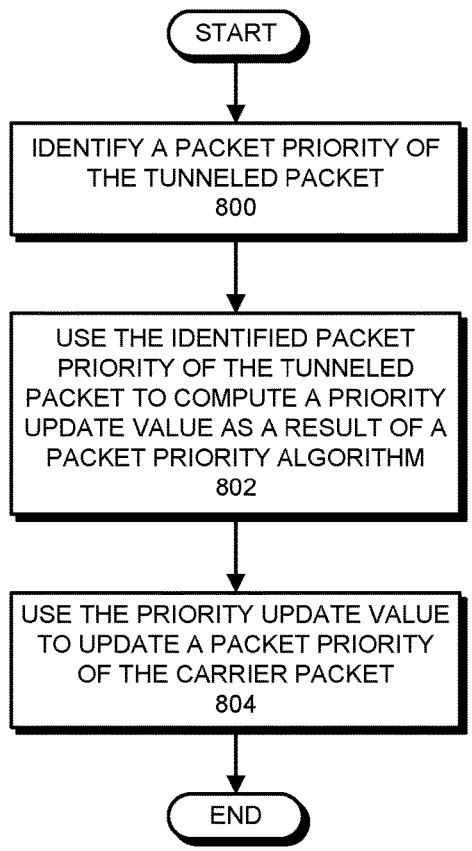
FIG. 8 presents a flowchart illustrating a process for using a packet priority algorithm for updating a packet priority of a carrier packet based on a packet priority of a tunneled packet in accordance with some embodiments.

Using a Priority Mapping Table for Updating a Packet Priority for a Carrier Packet FIG. 7 presents a flowchart illustrating a process for using a priority mapping table for updating a packet priority of a carrier packet based on a packet priority of a tunneled packet in accordance with some embodiments. In some embodiments, the operations shown in FIG. 7 are performed as part of the process shown in FIG. 6, e.g., are performed instead of steps 604-606. Note that the operations shown in FIG. 7 are presented as a general example of functions performed by some embodiments. The operations performed by other embodiments include different operations and/or operations that are performed in a different order. Additionally, although certain mechanisms are used in describing the process, in some embodiments, other mechanisms can perform the operations. For example, although an embodiment is described in which a piece of network equipment performs the operations, in some embodiments an interconnect device and/or another device performs the operations.

The process shown in FIG. 7 starts when a piece of network equipment identifies a packet protocol of a tunneled packet (step 700). During this operation, the piece of network equipment (e.g., the packet pattern matcher or a priority update logic), based on a known format of the tunneled packet (e.g., determined using a packet template), acquires a value representing the packet priority of the tunneled packet from the payload of the received packet. For example, in some embodiments, a set of N bits (where N is one or more), which indicate the packet priority of the tunneled packet, are acquired from a known location of the tunneled packet in the payload of the received packet.

The piece of network equipment then uses the identified packet priority for the tunneled packet to acquire a packet priority from a priority mapping table (e.g., priority mapping table 514) (step 702). For this operation, the packet priority for the tunneled packet is used to perform a lookup, retrieval, or other operation in the priority mapping table to find a corresponding packet priority update value. For example, the packet priority for the tunneled packet can be compared to stored values of packet priorities for tunneled packets in one or more (and possibly all) entries in the priority mapping table. The packet priority update value can then be acquired from an entry with a matching packet priority for a tunneled packet.

The piece of network equipment then uses the packet priority update value to update the packet priority of the carrier packet (step 704). For this operation, the piece of network equipment can directly update the packet priority of the carrier packet using the packet priority update value. For example, by replacing some or all of the packet priority of the carrier packet with some or all of the packet priority update value. Alternatively, the piece of network equipment can indirectly update the packet priority of the carrier packet using the packet priority update value, such as by converting, translating, or otherwise replacing the packet priority of the carrier packet using the packet priority update value. Note that this operation achieves a similar result to step 606, in that the "based on the packet priority of the tunneled packet" portion of step 606 is achieved using the packet priority update value computed using/from the packet priority of the tunneled packet.

Using a Packet Priority Algorithm for Updating a Packet Priority for a Carrier Packet FIG. 8 presents a flowchart illustrating a process for using a packet priority algorithm for updating a packet priority of a carrier packet based on a packet priority of a tunneled packet in accordance with some embodiments. In some embodiments, the operations shown in FIG. 8 are performed as part of the process shown in FIG. 6, e.g., are performed instead of steps 604-606. Note that the operations shown in FIG. 8 are presented as a general example of functions performed by some embodiments. The operations performed by other embodiments include different operations and/or operations that are performed in a different order. Additionally, although certain mechanisms are used in describing the process, in some embodiments, other mechanisms can perform the operations. For example, although an embodiment is described in which a piece of network equipment performs the operations, in some embodiments an interconnect device and/or another device performs the operations.

The process shown in FIG. 8 starts when a piece of network equipment identifies a packet protocol of a tunneled packet (step 800). During this operation, the piece of network equipment (e.g., the packet pattern matcher or a priority update logic), based on a known format of the tunneled packet (e.g., determined using a packet template), acquires a value representing the packet priority of the tunneled packet from the payload of the received packet. For example, in some embodiments, a set of N bits (where N is one or more), which indicate the packet priority of the tunneled packet, are acquired from a known location of the tunneled packet in the payload of the received packet.

The piece of network equipment then uses the identified packet priority for the tunneled packet to compute a packet priority as a result of a packet priority algorithm (step 802). For this operation, the packet priority for the tunneled packet is used as an input to the packet priority algorithm, perhaps along with one or more other inputs, constants, bias values, etc., and a result of the packet priority algorithm, which is the packet priority update value, is computed by the piece of network equipment. The packet priority algorithm can include any number of mathematical, logical, bitwise, and/or other operations that generate the priority update value based on the tunneled packet priority value and possibly the one or more other values (e.g., control values, multipliers/divisors, constants, etc.). For example, in some embodiments, the packet priority algorithm includes a multiplication or division of the packet priority of the tunneled packet by an adjustment factor, the adjustment factor selected to result in an available packet priority update value for each packet priority of a tunneled packet. For instance, assuming that the available packet priority update values are 2, 4, and 6, and the packet priority of the tunneled packet is a value 1-3, the adjustment factor can be 2 (a similar effect can also be achieved with a bitwise left-shift operation). As another example, in some embodiments, the packet priority algorithm includes an addition or subtraction of a constant to or from the packet priority of the tunneled packet. Generally, the packet priority algorithm can include any number of operations that result in, given particular values of packet priority for tunneled packets, corresponding packet priority update values.

The piece of network equipment then uses the packet priority update value to update the packet priority of the carrier packet (step 804). For this operation, the piece of network equipment can directly update the packet priority of the carrier packet using the packet priority update value. For example, by replacing some or all of the packet priority of the carrier packet with some or all of the packet priority update value. Alternatively, the piece of network equipment can indirectly update the packet priority of the carrier packet using the packet priority update value, such as by converting, translating, or otherwise replacing the packet priority of the carrier packet using the packet priority update value. Note that this operation achieves a similar result to step 606, in that the "based on the packet priority of the tunneled packet" portion of step 606 is achieved using the packet priority update value computed using/from the packet priority of the tunneled packet.

Dynamically Updating the Priority Mapping Table or the Packet Priority Algorithm In some embodiments, the above-described priority mapping table and/or packet priority algorithm can be dynamically updated, i.e., updated during runtime, after a startup operation, etc. In these embodiments, an entity such as a system administrator, network traffic control hardware, an operating system, or a software application can configure or otherwise provide one or more files, memory locations, values, signals, etc. that include update information for the priority mapping table and/or packet priority algorithm. For example, an update for the priority mapping table may include updates one or more entries in the priority mapping table, i.e., for a priority update value associated with a corresponding different packet priority of a tunneled packet for each entry. In this way, the priority mapping table and/or packet priority algorithm can be updated to control the flow of network traffic from corresponding network equipment. More specifically, the updates can dictate which packet priorities for carrier packets are associated with which packet priorities for tunneled packets.

In some embodiments, updating the priority mapping table and/or packet priority algorithm includes communicating a command to a piece of network equipment (or other device) to cause the update. For example, a control packet or other type of packet may be communicated to the piece of network equipment that directly includes the update, i.e., that includes information about and for the update. Upon receiving such a packet, the piece of network equipment can use the information therein to perform the update. As another example, a designated signal and/or packet may be communicated to the piece of network equipment to indicate generally that the update is to be performed and the piece of network equipment can, based on receiving the signal and/or packet, perform one or more update operations. For instance, the piece of network equipment may retrieve update information from a local memory and/or a remote device (e.g., retrieve a file, information from a memory element or register, etc.) and use the update information to directly or indirectly update the priority mapping table and/or the packet priority algorithm. As yet another example, a remote device can be plugged in to a piece of network equipment, e.g., via a USB or RS232 port and can communicate the update information to the piece of network equipment.

Figure 9:
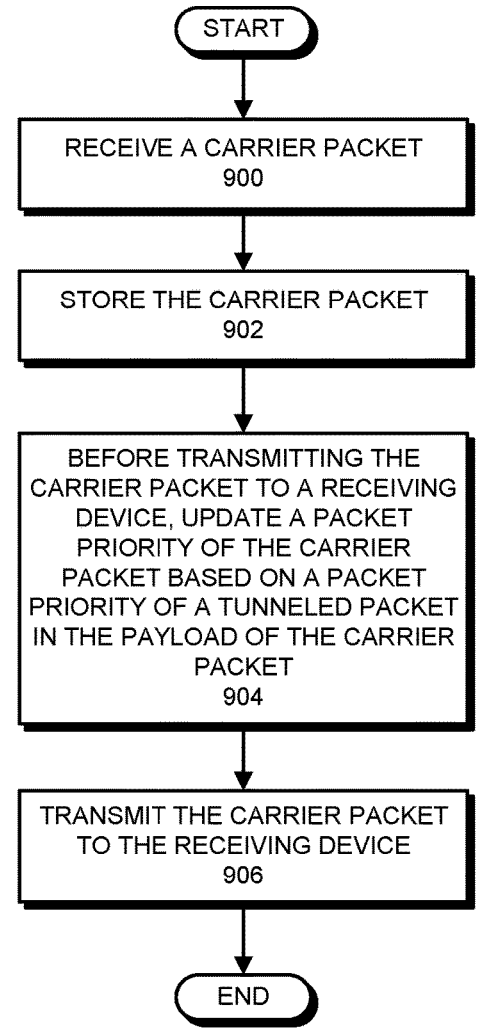
FIG. 9 presents a flowchart illustrating an embodiment in which the packet priority of a carrier packet is updated before transmitting the carrier packet to a receiving device in accordance to some embodiments.

Updating the Packet Priority of the Carrier Packet Before Transmitting the Carrier Packet In some embodiments, the piece of network equipment (or interconnect device, etc.) receives entire packets before transmitting the packets to a receiving device (e.g., downstream network equipment such as a next router or switch in a multi-hop path between devices coupled to the network). FIG. 9 presents a flowchart illustrating an embodiment in which the packet priority of a carrier packet is updated before transmitting the carrier packet to a receiving device in accordance to some embodiments. Note that the operations shown in FIG. 9 are presented as a general example of functions performed by some embodiments. The operations performed by other embodiments include different operations and/or operations that are performed in a different order. Additionally, although certain mechanisms are used in describing the process, in some embodiments, other mechanisms can perform the operations. For example, although an embodiment is described in which a piece of network equipment performs the operations, in some embodiments an interconnect device and/or another device performs the operations.

For the process shown in FIG. 9, a received packet is assumed to include a tunneled packet in its payload—and is thus a carrier packet. For clarity and brevity, some operations, such as those shown in FIG. 6 and/or FIGS. 7-8, are not shown in FIG. 9—but are assumed to be performed by the piece of network equipment as part of the operations relating to updating the packet priority of the carrier packet.

The process shown in FIG. 9 starts when a piece of network equipment receives a carrier packet (step 900). For example, an I/O port (e.g., I/O port 404) of the piece of network equipment may receive, on a network interface, the packet from a remote sending device, such as a sending device coupled to a network with the piece of network equipment.

The piece of network equipment, as the carrier packet is received, stores the carrier packet in a buffer (step 902). Generally, for this operation, the piece of network equipment receives and temporarily stores one or more portions of the carrier packet until the entire carrier packet, including indications of both carrier packet priority and tunneled packet priority, have been received. For example, the piece of network equipment may store the carrier packet in a receive buffer (e.g., receive buffer 504) or a transmit buffer (e.g., transmit buffer 506).

Before transmitting the carrier packet to a receiving device, the piece of network equipment updates the packet priority of the carrier packet based on the packet priority of the tunneled packet (step 904). For this operation, the piece of network equipment acquires the packet priority of the tunneled packet from the payload of the carrier packet and uses the packet priority of the tunneled packet to update the packet priority of the carrier packet at a corresponding location in the carrier packet (e.g., in a header of the carrier packet). For example, the piece of network equipment may perform a lookup in a priority mapping table to acquire a priority update value based on the packet priority of the tunneled packet (e.g., as described for FIG. 7) or compute the priority update value as a result of a packet priority algorithm based on the packet priority of the tunneled packet (e.g., as described in FIG. 8). The piece of network equipment then uses the packet priority update value to update the packet priority of the carrier packet by replacing the packet priority of the carrier packet with the packet priority update value or otherwise indirectly use the packet priority update value to update the packet priority of the carrier packet, such as by converting, translating, or otherwise replacing the packet priority of the carrier packet based on the packet priority update value.

The piece of network equipment then transmits the carrier packet—with the updated packet priority for the carrier packet—to the receiving device (step 906). Upon receiving the carrier packet with the updated packet priority, the receiving device processes the carrier packet in accordance with the packet priority of the carrier packet. By updating the packet priority of the carrier packet as described, these embodiments ensure that the packet priority of the tunneled packet is taken into account when processing the carrier packet in the receiving device (and other devices). This can enable more appropriate service levels to be provided to the carrier packet in the receiving device (and other devices) based on the packet priority of the tunneled packet.

Updating the Packet Priority of the Carrier Packet after Transmitting a Portion of the Carrier Packet In some embodiments, pieces of network equipment (or interconnect devices, etc.) transmit portions of packets to receiving devices (i.e., downstream network equipment, interconnect devices, etc.) as soon as the portions have been received, and possibly before other/remaining portions of the packets have been received from sending devices—which can be called "eager" transmission of the packet. For example, the piece of network equipment may be configured to transmit portions of packets as soon as the piece of network equipment has received X-byte chunks of the packets (where X is a number such as 8, 14, etc.). In other words, a portion of the packet may be re-packaged in another, perhaps smaller-sized, packet and transmitted to the receiving device as soon as the portion is received. In some cases, the eager transmission of packets results in the indication of the packet priority of a carrier packet being transmitted to a receiving device before the packet priority of the carrier packet can be updated based on the packet priority of a tunneled packet. For example, the header, payload, etc. of the carrier packet including the indication of the packet priority of the carrier packet, can be within the portion and transmitted to a receiving device before the packet priority of the carrier packet is updated. The described embodiments perform operations for updating packet priorities of carrier packets based on packet priorities of tunneled packets despite the eager transmission of indications of packet priorities of the carrier packets.

Figure 11:
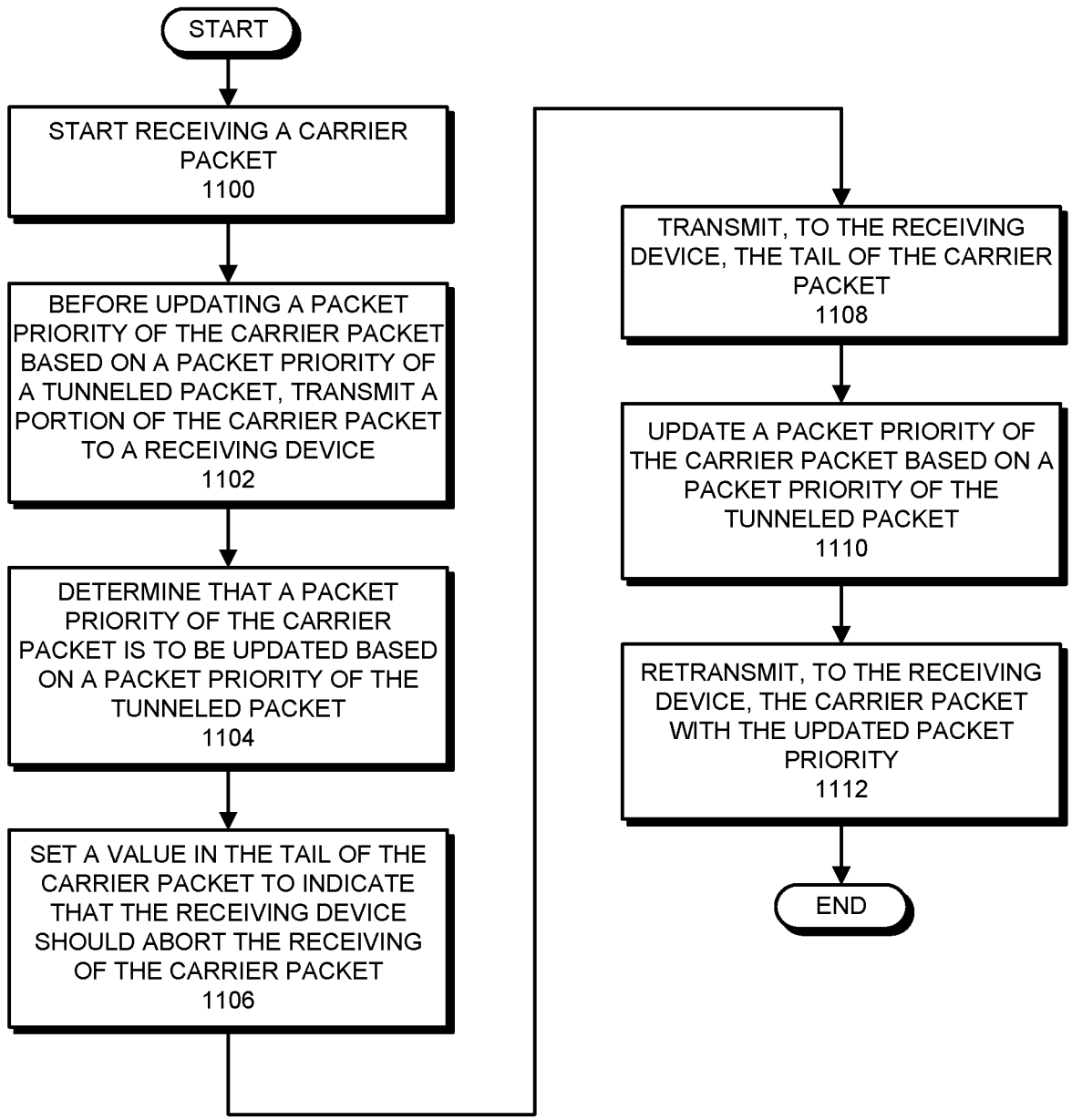
FIG. 11 presents a flowchart illustrating a process for updating a packet priority of a carrier packet based on a packet priority of a tunneled packet using an abort request in a tail of the carrier packet in accordance with some embodiments.
Figure 12:
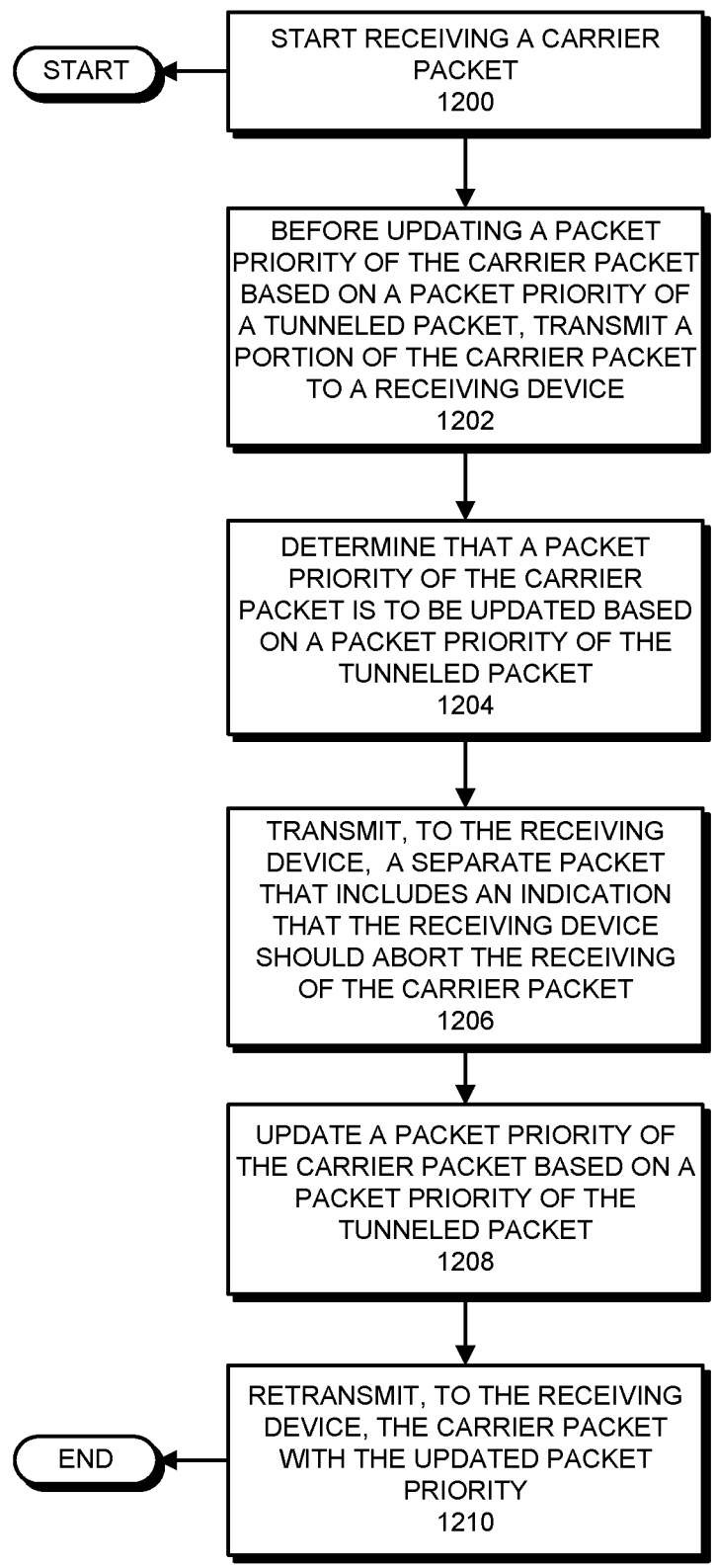
FIG. 12 presents a flowchart illustrating a process for updating a packet priority of a carrier packet based on a packet priority of a tunneled packet using an abort request sent to a receiving device in a separate packet in accordance with some embodiments.

Examples of embodiments that update the packet priority of the carrier packet as described above are presented in FIGS. 10-12. Generally, the examples differ in how the eager transmission of the packet priority of the carrier packet to a receiving device is handled when it is determined that an update is to be made to the packet priority of the carrier packet based on the packet priority of a tunneled packet. The overall effect of each of the embodiments in FIGS. 10-12 is that a receiving device eventually receives a packet priority for a carrier packet that is updated based on a packet priority of a tunneled packet.

Figure 10:
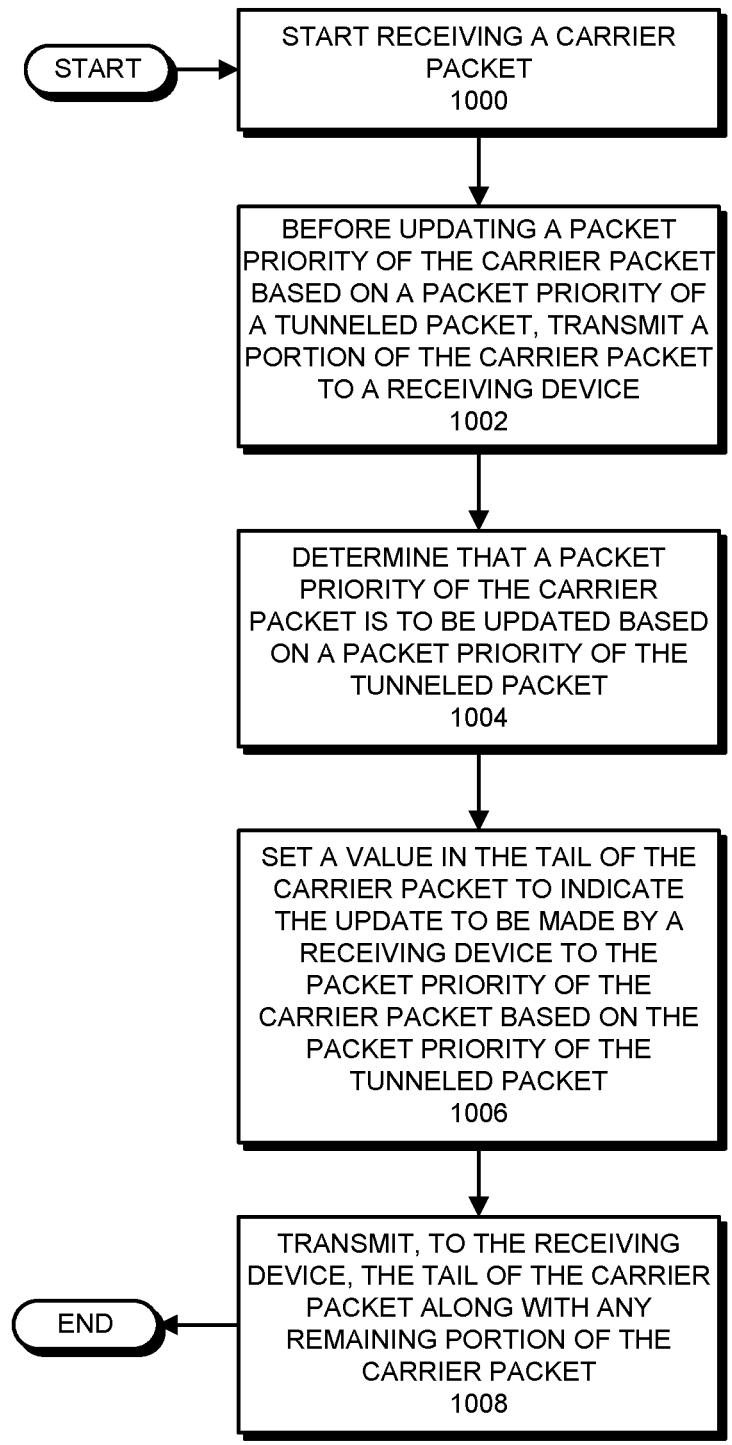
FIG. 10 presents a flowchart illustrating a process for updating a packet priority of a carrier packet based on a packet priority of a tunneled packet using a value in a tail of the carrier packet in accordance with some embodiments.

FIG. 10 presents a flowchart illustrating a process for updating a packet priority of a carrier packet based on a packet priority of a tunneled packet using a value in a tail of the carrier packet in accordance with some embodiments. Generally, during this operation, a piece of network equipment uses a value in the tail of the packet to cause a receiving device to update a packet priority of a carrier packet for which an indication of the packet priority was already (eagerly) transmitted to the receiving device. Note that the operations shown in FIG. 10 are presented as a general example of functions performed by some embodiments. The operations performed by other embodiments include different operations and/or operations that are performed in a different order. Additionally, although certain mechanisms are used in describing the process, in some embodiments, other mechanisms can perform the operations. For example, although an embodiment is described in which a piece of network equipment performs the operations, in some embodiments an interconnect device and/or another device performs the operations.

For the process shown in FIG. 10, a received packet is assumed to include a tunneled packet in its payload—and is thus a carrier packet. For clarity and brevity, some operations, such as those shown in FIG. 6 and/or FIGS. 7-8, are not shown in FIG. 10—but are assumed to be performed by the piece of network equipment as part of the operations relating to updating the packet priority of the carrier packet.

The process shown in FIG. 10 starts when a piece of network equipment starts receiving a carrier packet (step 1000). For example, an I/O port (e.g., I/O port 404) of the piece of network equipment may receive, on a network interface, some of the packet from a remote sending device, such as a sending device coupled to a network with the piece of network equipment.

The piece of network equipment then, before updating the packet priority of the carrier packet based on the packet priority of the tunneled packet, transmits a portion of the carrier packet to a receiving device (step 1002). For example, the piece of network equipment may transmit the portion of the carrier packet before the packet priority of the tunneled packet has been received (i.e., before receiving the corresponding portion of the tunneled packet in the payload of the carrier packet). As another example, the piece of network equipment may transmit the portion of the carrier packet after the packet priority of the tunneled packet has been received, but before all of the processing operations for updating the packet priority of the carrier packet based on the packet priority of the tunneled packet have been completed (e.g., before the determining, identifying, and updating operations FIG. 6 have all been completed). Generally, during this operation, an indication of the packet priority of the carrier packet is eagerly transmitted to a receiving device without updating the indication. Unless, therefore, the indication is updated, the receiving device may not use a correct (i.e., updated) value of packet priority for the carrier packet for handling the carrier packet.

Because the indication of the packet priority of the carrier packet has already been transmitted to the receiving device, the piece of network equipment can no longer directly update the packet priority of the carrier packet simply by updating the indication of the packet priority in the carrier packet. Instead, the piece of network equipment uses a part of the carrier packet that is still under the control of the piece of network equipment to indirectly update the packet priority of the carrier packet. For the example in FIG. 10, the part of the carrier packet is the tail of the carrier packet. In other words, the tail of the carrier packet is assumed to not yet have been sent to the receiving device—and may be deliberately delayed by the piece of network equipment to enable the operations shown in FIG. 10. When the piece of network equipment eventually determines that the packet priority of the carrier packet is to be updated based on the packet priority of the tunneled packet (i.e., by performing the corresponding operations of FIGS. 6 and/or 7-8) (step 1004), the piece of network equipment sets a value in the tail of the carrier packet to indicate the update to be made to the packet priority of the carrier packet based on the packet priority of the tunneled packet (step 1006).

When setting the value in the tail of the carrier packet as described, the piece of network equipment sets one or more predetermined bits in the tail of the carrier packet. For example, the value in the tail of the packet can be set in a reserved or purpose-specific portion of the tail, such as in one or more bits of the tail that are set aside/allocated in a packet protocol or format for holding information about an update to the packet priority of the carrier packet. As another example, the value in the tail of the packet can be set in a typically unused portion of the tail, such as in bits that are reserved and/or are normally unused in the tail in accordance with a corresponding protocol or format. As yet another example, one or more bits in the tail that are typically used for a first purpose (e.g., error checking, etc.) may be wholly or partially replaced or combined (e.g., added to, logically ANDed, etc.) with the value, such as when an expected or known value is logically combined with an indication of the packet priority of the carrier packet to create a third value from which the packet priority of the carrier packet can be computed, recovered, etc. by the receiving device.

In these embodiments, the value that the piece of network equipment sets in the tail of the carrier packet is configured to cause the receiving device to update the packet priority of the carrier packet. For example, in some embodiments, as part of processing information in the packet, the receiving device processes the value in the tail of the carrier packet, which causes the receiving device to perform a corresponding update of the packet priority of the carrier packet. For instance, the receiving device may use the value from the tail of the carrier packet to update the packet priority of the carrier packet by replacing the packet priority of the carrier packet with the value or otherwise indirectly use the value to update the packet priority of the carrier packet, such as by converting, translating, or otherwise replacing the packet priority of the carrier packet based on the value.

The piece of network equipment then transmits, to the receiving device, the tail of the carrier packet along with any remaining portion of the carrier packet (step 1008). As described above, upon receiving the tail of the carrier packet, the receiving device performs the update of the packet priority of the carrier packet and then processes the carrier packet in accordance with the packet priority of the carrier packet. By updating the packet priority of the carrier packet as described, these embodiments ensure that the packet priority of the tunneled packet is taken into account when processing the carrier packet in the receiving device (and other devices). This can enable more appropriate service levels to be provided to the carrier packet in the receiving device (and other devices) based on the packet priority of the tunneled packet.

FIG. 11 presents a flowchart illustrating a process for updating a packet priority of a carrier packet based on a packet priority of a tunneled packet using an abort request in a tail of the carrier packet in accordance with some embodiments. Generally, during this operation, a piece of network equipment uses a value in the tail of the packet to cause a receiving device to abort the receiving of a carrier packet for which an indication of the packet priority was already/eagerly transmitted to the receiving device. The piece of network equipment then itself updates the packet priority of the carrier packet based on the packet priority of a tunneled packet and retransmits the carrier packet to the receiving device. Note that the operations shown in FIG. 11 are presented as a general example of functions performed by some embodiments. The operations performed by other embodiments include different operations and/or operations that are performed in a different order. Additionally, although certain mechanisms are used in describing the process, in some embodiments, other mechanisms can perform the operations. For example, although an embodiment is described in which a piece of network equipment performs the operations, in some embodiments an interconnect device and/or another device performs the operations.

For the process shown in FIG. 11, a received packet is assumed to include a tunneled packet in its payload—and is thus a carrier packet. For clarity and brevity, some operations, such as those shown in FIG. 6 and/or FIGS. 7-8, are not shown in FIG. 11—but are assumed to be performed by the piece of network equipment as part of the operations relating to updating the packet priority of the carrier packet.

The process shown in FIG. 11 starts when a piece of network equipment starts receiving a carrier packet (step 1100). For example, an I/O port (e.g., I/O port 404) of the piece of network equipment may receive, on a network interface, some of the packet from a remote sending device, such as a sending device coupled to a network with the piece of network equipment.

The piece of network equipment then, before updating the packet priority of the carrier packet based on the packet priority of the tunneled packet, transmits a portion of the carrier packet to a receiving device (step 1102). For example, the piece of network equipment may transmit the portion of the carrier packet before the packet priority of the tunneled packet has been received (i.e., before receiving the corresponding portion of the tunneled packet in the payload of the carrier packet). As another example, the piece of network equipment may transmit the portion of the carrier packet after the packet priority of the tunneled packet has been received, but before all of the processing operations for updating the packet priority of the carrier packet based on the packet priority of the tunneled packet have been completed (e.g., before the determining, identifying, and updating operations FIG. 6 have all been completed). Generally, during this operation, an indication of the packet priority of the carrier packet is eagerly transmitted to a receiving device without updating the indication. Unless, therefore, the indication is updated, the receiving device may not use a correct (i.e., updated) value of packet priority for the carrier packet for handling the carrier packet.

Because the indication of the packet priority of the carrier packet has already been transmitted to the receiving device, the piece of network equipment can no longer directly update the packet priority of the carrier packet simply by updating the indication of the packet priority in the carrier packet. Instead, the piece of network equipment uses a part of the carrier packet that is still under the control of the piece of network equipment to update the packet priority of the carrier packet. For the example in FIG. 11, the part of the carrier packet is the tail of the carrier packet. In other words, the tail of the carrier packet is assumed to not yet have been sent to the receiving device—and may be deliberately delayed by the piece of network equipment to enable the operations shown in FIG. 11. When the piece of network equipment eventually determines that the packet priority of the carrier packet is to be updated based on the packet priority of the tunneled packet (i.e., by performing the corresponding operations of FIGS. 6 and/or 7-8) (step 1104), the piece of network equipment sets a value in the tail of the carrier packet to indicate that the receiving device should abort the receiving of the carrier packet (step 1106). When "aborting" the receiving of the carrier packet, the receiving device deletes/discards any received portions of the carrier packet and stops further processing for the carrier packet.

When setting the value in the tail of the carrier packet as described, the piece of network equipment sets one or more predetermined bits in the tail of the carrier packet. For example, the value in the tail of the packet can be set in a reserved or purpose-specific portion of the tail, such as in one or more bits of the tail that are set aside/allocated in a packet protocol or format for holding a request value that requests the abortion of the receiving of the corresponding packet. As another example, the value in the tail of the packet can be set in a typically unused portion of the tail, such as in bits that are reserved and/or are normally unset in the tail in accordance with a corresponding protocol or format. As yet another example, one or more bits in the tail that are typically used for a first purpose (e.g., error checking, etc.) may be wholly or partially replaced or combined (e.g., added to, logically ANDed, etc.) with the value, such as when an expected or known value is logically combined with the value (i.e., the abortion indicating value) to create a third value from which the packet priority of the carrier packet can be computed, recovered, etc. by the receiving device.

In these embodiments, the value that the piece of network equipment sets in the tail of the carrier packet is configured to cause the receiving device to abort the receiving of the carrier packet. For example, in some embodiments, as part of processing information in the packet, the receiving device processes the value in the tail of the carrier packet, which causes the receiving device to abort the receiving of the carrier packet. For instance, the value in the tail of the carrier packet may be a reserved value such as a reserved bit pattern according to the protocol or format of the carrier packet and/or of the receiving device itself.

The piece of network equipment then transmits, to the receiving device, the tail of the carrier packet along with any remaining portion of the carrier packet (step 1108). As described above, upon receiving the tail of the carrier packet, the receiving device aborts the receiving of the carrier packet as described above.

The piece of network equipment next updates a packet priority of the carrier packet based on a packet priority of the tunneled packet (step 1110). Generally, for this operation, the piece of network equipment updates the packet priority of the carrier packet so that the receiving device processes the carrier packet using a packet priority that reflects the packet priority of the tunneled packet—which may be different than an original packet priority of the carrier packet.

The piece of network equipment then retransmits, to the receiving device, the carrier packet with the updated packet priority (step 1112). Upon receiving the carrier packet with the updated packet priority, the receiving device processes the carrier packet in accordance with the packet priority of the carrier packet. By updating the packet priority of the carrier packet as described, these embodiments ensure that the packet priority of the tunneled packet is taken into account when processing the carrier packet in the receiving device (and other devices). This can enable more appropriate service levels to be provided to the carrier packet in the receiving device (and other devices) based on the packet priority of the tunneled packet.

FIG. 12 presents a flowchart illustrating a process for updating a packet priority of a carrier packet based on a packet priority of a tunneled packet using an abort request sent to a receiving device in a separate packet in accordance with some embodiments. Generally, during this operation, a piece of network equipment sends, to a receiving device, a separate packet (e.g., a control packet and/or another packet) to cause a receiving device to abort the receiving of a carrier packet for which an indication of the packet priority was already/eagerly transmitted to the receiving device. The piece of network equipment then itself updates the packet priority of the carrier packet based on the packet priority of a tunneled packet and retransmits the carrier packet to the receiving device. Note that the operations shown in FIG. 12 are presented as a general example of functions performed by some embodiments. The operations performed by other embodiments include different operations and/or operations that are performed in a different order. Additionally, although certain mechanisms are used in describing the process, in some embodiments, other mechanisms can perform the operations. For example, although an embodiment is described in which a piece of network equipment performs the operations, in some embodiments an interconnect device and/or another device performs the operations.

For the process shown in FIG. 12, a received packet is assumed to include a tunneled packet in its payload—and is thus a carrier packet. For clarity and brevity, some operations, such as those shown in FIG. 6 and/or FIGS. 7-8, are not shown in FIG. 12—but are assumed to be performed by the piece of network equipment as part of the operations relating to updating the packet priority of the carrier packet.

The process shown in FIG. 12 starts when a piece of network equipment starts receiving a carrier packet (step 1200). For example, an I/O port (e.g., I/O port 404) of the piece of network equipment may receive, on a network interface, some of the packet from a remote sending device, such as a sending device coupled to a network with the piece of network equipment.

The piece of network equipment then, before updating the packet priority of the carrier packet based on the packet priority of the tunneled packet, transmits a portion of the carrier packet to a receiving device (step 1202). For example, the piece of network equipment may transmit the portion of the carrier packet before the packet priority of the tunneled packet has been received (i.e., before receiving the corresponding portion of the tunneled packet in the payload of the carrier packet). As another example, the piece of network equipment may transmit the portion of the carrier packet after the packet priority of the tunneled packet has been received, but before all of the processing operations for updating the packet priority of the carrier packet based on the packet priority of the tunneled packet have been completed (e.g., before the determining, identifying, and updating operations FIG. 6 have all been completed). Generally, during this operation, an indication of the packet priority of the carrier packet is eagerly transmitted to a receiving device without updating the indication. Unless, therefore, the indication is updated, the receiving device may not use a correct (i.e., updated) value of packet priority for the carrier packet for handling the carrier packet.

Because the indication of the packet priority of the carrier packet has already been transmitted to the receiving device, the piece of network equipment can no longer directly update the packet priority of the carrier packet simply by updating the indication of the packet priority in the carrier packet. Instead, the piece of network equipment uses a separate packet to enable the updating of the packet priority of the carrier packet. For example, in some embodiments, a protocol or format of a communication session between the piece of network equipment and the receiving device includes control packets that are sent from the piece of network equipment to the receiving device periodically, e.g., every M frames or milliseconds, where M is a number set in accordance with the protocol or format, set by the piece of network equipment and/or receiving device, etc. In these embodiments, the control packet includes an indication that the receiving of an identified packet (such as the carrier packet) is to be aborted. When the piece of network equipment eventually determines that the packet priority of the carrier packet is to be updated based on the packet priority of the tunneled packet (i.e., by performing the corresponding operations of FIGS. 6 and/or 7-8) (step 1204), the piece of network equipment transmits, to the receiving device, the separate packet including the indication that the receiving device should abort the receiving of the carrier packet (step 1206). When "aborting" the receiving of the carrier packet, the receiving device deletes/discards any received portions of the carrier packet and stops further processing for the carrier packet.

Although a separate packet is described as being sent by the piece of network equipment, in some embodiments, a different form of communication is used. For example, in some embodiments, the piece of network equipment may simply not send any more of the carrier packet to the receiving device, leaving the receiving device waiting for the remainder of the packet. After a timeout period, the receiving device will automatically discard the packet, which is a similar effect (i.e., the carrier packet is discarded) to the operations performed upon receiving the separate packet sent in step 1206. As another example, the piece of network equipment may use a sideband signal, a mailbox or flag memory location, etc. to communicate the abortion of the receiving of the carrier packet. Generally, the piece of network equipment ensures that the receiving device does not complete the receiving (and thus perform subsequent processing) of the carrier packet, thereby enabling the retransmission of the carrier packet with an updated packet priority as described below.

The piece of network equipment next updates a packet priority of the carrier packet based on a packet priority of the tunneled packet (step 1208). Generally, for this operation, the piece of network equipment updates the packet priority of the carrier packet so that the receiving device processes the carrier packet using a packet priority that reflects the packet priority of the tunneled packet—which may be different than an original packet priority of the carrier packet.

The piece of network equipment then retransmits, to the receiving device, the carrier packet with the updated packet priority (step 1210). Upon receiving the carrier packet with the updated packet priority, the receiving device processes the carrier packet in accordance with the packet priority of the carrier packet. By updating the packet priority of the carrier packet as described, these embodiments ensure that the packet priority of the tunneled packet is taken into account when processing the carrier packet in the receiving device (and other devices). This can enable more appropriate service levels to be provided to the carrier packet in the receiving device (and other devices) based on the packet priority of the tunneled packet.

Updating Packet Information Using the Tail of the Packet

As described above, in some embodiments, a value is put in the tail of a carrier packet to cause a receiving device to update a packet priority of the carrier packet based on a packet priority of a tunneled packet. The described embodiments are not, however, limited to using the tail of the packet for this purpose. In some embodiments, a piece of network equipment can use the tail of the packet updating or otherwise changing the value of some or all of the remainder of the packet. For example, a packet sequence number, timestamp, payload, etc., may be updated using the tail of the packet in a similar way to the above-described use of the tail of the packet for updating the packet priority value. Such updating or changing may be performed, as also described above, even where the particular value to be updated/changed has already been transmitted to the receiving device—and the tail of the packet may be held or delayed for this purpose until it is clear that such an update/change is not desired.

Multiple Tunneled Packets in a Carrier Packet

Although embodiments are described herein in which carrier packets include only single tunneled packets in their payloads, in some embodiments, multiple tunneled packets may be included in the payload of a single carrier packet. In other words, a carrier packet may have, included in its payload, two or more separate and complete tunneled packets (possibly with separate headers, payloads, priority indicators, etc.). In these embodiments, the operations for updating the packet priority of carrier packets based on the packet priority of tunneled packets are changed to include operations for handling the possibility of receiving multiple tunneled packets, each of which may have a separate packet priority, within payloads of carrier packets.

In embodiments where multiple tunneled packets may be included in the payload of a single carrier packet, the operation of determining that the packet is a carrier packet (e.g., step 602) is changed to include an operation for determining that multiple tunneled packets are included in the payload of a carrier packet. For example, one or more packet templates may be compared to multiple parts or portions of the payload of the carrier packet. As another example, one or more indicators, counters, etc. may be acquired from the carrier packet and used to determine that two or more tunneled packets are included in the payload of the carrier packet. Generally, for this operation, number, locations, and/or arrangement of multiple tunneled packets in the payload of a carrier packet is determined to enable the subsequent identification of the packet priorities of some or all of the tunneled packets.

In embodiments where multiple tunneled packets may be included in the payload of a single carrier packet, the operation of identifying the packet priority of the tunneled packet (e.g., step 604, etc.) is changed to include an operation for identifying a single packet priority for the multiple tunneled packets to be used to update the packet priority of the carrier packet. For example, the first/last, highest/lowest, average, sum/difference, etc. of the packet priorities of the multiple tunneled packets included in the payload of a carrier packet may be identified. Generally, for this operation, some or all of the packet priorities of the multiple tunneled packets in the payload of a carrier packet are individually identified and then used to determine a packet priority update value for updating the packet priority of the carrier packet.

In some embodiments, for eager transmission of the carrier packet, a record is kept of tunneled packets that were received and eagerly transmitted to a receiving device. For example, some or all of the packet priorities for the multiple tunneled packets or a value based thereon (e.g., a highest, lowest, average, etc. packet priority of the tunneled packets) may be determined and stored/recorded, even after a corresponding portion of the carrier packet is transmitted to a receiving device. The stored packet priority information can then be used to identify the single packet priority for the multiple tunneled packets in the payload of a carrier packet as described herein.

In some embodiments, a computing device (e.g., network equipment 206 or 208, interconnect device 306 or 308, and/or some portion thereof) uses code and/or data stored on a non-transitory computer-readable storage medium to perform some or all of the operations herein described. More specifically, the computing device reads the code and/or data from the computer-readable storage medium and executes the code and/or uses the data when performing the described operations. A computer-readable storage medium can be any device, medium, or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs).

In some embodiments, one or more hardware modules are configured to perform the operations herein described. For example, the hardware modules can include, but are not limited to, one or more processors/cores/central processing units (CPUs), application-specific integrated circuit (ASIC) chips, field-programmable gate arrays (FPGAs), caches/cache controllers, memory management units, compute units, embedded processors, graphics processors (GPUs)/graphics cores, pipelines, Accelerated Processing Units (APUs), cache controllers/caches, input/output ports, network equipment, interconnect devices, and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., network equipment 206 or 208, interconnect devices 306 or 308, and/or some portion thereof) is stored on a non-transitory computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware including the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuit elements that perform the described operations. For example, the circuit elements may include integrated circuits, discrete circuit elements, etc. In some embodiments, the circuits in a functional block include circuits that execute program code (e.g., microcode, firmware, applications, etc.) to perform the described operations. For example, a functional block may include one or more processing pipelines, compute units, dedicated processing circuits, etc.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for handling network packets in a receiving device, comprising:
  receiving, by the receiving device, via a network interface coupled to a network, from a remote sending device coupled to the network, a carrier packet, the carrier packet including, in a payload of the carrier packet, a tunneled packet, wherein the tunneled packet includes a packet priority of the tunneled packet and the carrier packet includes a packet priority of the carrier packet, and wherein the remote sending device, while generating the carrier packet, incorporated the tunneled packet in the payload of the carrier packet; and
  processing, by the receiving device, the carrier packet to update the packet priority of the carrier packet based on the packet priority of the tunneled packet, the processing including:

acquiring, by the receiving device, a packet priority of the tunneled packet from the payload of the tunneled packet; and updating, by the receiving device, the packet priority of the carrier packet based on the packet priority of the tunneled packet that is acquired from the payload of the tunneled packet.

2. The method of claim 1, further comprising:
determining, by the receiving device, based on a packet template, that the carrier packet includes, within the payload of the carrier packet, the tunneled packet.

3. The method of claim 1, wherein updating the packet priority of the carrier packet based on the packet priority acquired from the tunneled packet comprises:
computing, by the receiving device, a packet priority update value as a result of a packet priority algorithm, an input of the packet priority algorithm being the packet priority of the tunneled packet; and updating, by the receiving device, the packet priority of the carrier packet using the packet priority update value.

4. The method of claim 1, wherein updating the packet priority of the carrier packet based on the packet priority acquired from the tunneled packet comprises:
acquiring, by the receiving device, using the packet priority of the tunneled packet, a packet priority update value from a priority mapping table, the priority mapping table including one or more entries, each entry including a priority update value associated with a corresponding different packet priority of a tunneled packet; and updating, by the receiving device, the packet priority of the carrier packet using the packet priority update value.

5. The method of claim 4, further comprising:
receiving, by the receiving device, an indication of a change to be made to the priority mapping table, the change involving updating, for at least one entry in the priority mapping table, the priority update value associated with the corresponding different packet priority of a tunneled packet; and based on the indication of the change, updating, by the receiving device, the priority mapping table.

6. The method of claim 1, further comprising:
updating, by the receiving device, the packet priority of the carrier packet based on the packet priority of the tunneled packet before transmitting the carrier packet to a next receiving device.

7. The method of claim 1, further comprising:
transmitting, by the receiving device, a portion of the carrier packet to a next receiving device before updating the packet priority of the carrier packet based on the packet priority of the tunneled packet, the portion including an indication of the packet priority of the carrier packet;

setting, by the receiving device, a value in a tail of the carrier packet to indicate the update to be made to the packet priority of the carrier packet based on the packet priority of the tunneled packet, the value in the tail of the carrier packet configured to cause the next receiving device to update the packet priority of the carrier packet; and transmitting, by the receiving device, to the next receiving device, the tail of the carrier packet along with any remaining portion of the carrier packet.

8. The method of claim 1, further comprising:
transmitting, by the receiving device, a portion of the carrier packet to a next receiving device before updating the packet priority of the carrier packet based on the packet priority of the tunneled packet, the portion including an indication of the packet priority of the carrier packet;

setting, by the receiving device, a value in a tail of the packet to indicate that receiving the carrier packet is to be aborted by the next receiving device;

transmitting, by the receiving device, to the next receiving device, the tail of the carrier packet; and updating, by the receiving device, the packet priority of the carrier packet based on the packet priority of the tunneled packet before retransmitting the carrier packet to the next receiving device.

9. The method of claim 1, further comprising:
transmitting, by the receiving device, a portion of the carrier packet to a next receiving device before updating the packet priority of the carrier packet based on the packet priority of the tunneled packet, the portion including an indication of the packet priority of the carrier packet;

transmitting, by the receiving device, to the next receiving device, a control packet, the control packet indicating that receiving the carrier packet is to be aborted by the next receiving device; and updating, by the receiving device, the packet priority of the carrier packet based on the packet priority of the tunneled packet before retransmitting the carrier packet to the next receiving device.

10. The method of claim 1, wherein the tunneled packet includes an indication of the packet priority of the tunneled packet, the indication of the packet priority of the tunneled packet being incorporated in the payload of the carrier packet.

11. A receiving device that handles network packets, the receiving device comprising:
an input/output (I/O) port in the receiving device that is coupled to a network, the I/O port configured to receive, from a remote sending device coupled to the network, a carrier packet, the carrier packet including, in a payload of the carrier packet, a tunneled packet, wherein the tunneled packet includes a packet priority of the tunneled packet and the carrier packet includes a packet priority of the carrier packet, and wherein the remote sending device, while generating the carrier packet, incorporated the tunneled packet in the payload of the carrier packet; and priority update logic coupled to the I/O port in the receiving device, the priority update logic configured to process the carrier packet to update the packet priority of the carrier packet based on the packet priority of the tunneled packet, the processing including:
acquiring, by the priority update logic, a packet priority of the tunneled packet from the payload of the tunneled packet; and updating, by the priority update logic, the packet priority of the carrier packet based on the packet priority of the tunneled packet that is acquired from the payload of the tunneled packet.

12. The receiving device of claim 11, further comprising:
a packet pattern matcher configured to determine, based on a packet template, that the carrier packet includes, within the payload of the carrier packet, the tunneled packet.

13. The receiving device of claim 11, wherein, when updating the packet priority of the carrier packet based on the packet priority of the tunneled packet, the priority update logic is configured to:
- compute a packet priority update value as a result of a packet priority algorithm, an input of the packet priority algorithm being the packet priority of the tunneled packet; and
- update the packet priority of the carrier packet using the packet priority update value.

14. The receiving device of claim 11, wherein, when updating the packet priority of the carrier packet based on the packet priority of the tunneled packet, the priority update logic is configured to:
- acquire, using the packet priority of the tunneled packet, a packet priority update value from a priority mapping table, the priority mapping table including one or more entries, each entry including a priority update value associated with a corresponding different packet priority of a tunneled packet; and
- update the packet priority of the carrier packet using the packet priority update value.

15. The receiving device of claim 14, wherein the receiving device is configured to:
- receive an indication of a change to be made to the priority mapping table, the change involving updating, for at least one entry in the priority mapping table, the priority update value associated with the corresponding different packet priority of a tunneled packet; and
- based on the indication of the change, update the priority mapping table.

16. The receiving device of claim 11, wherein the receiving device is configured to:
- update the packet priority of the carrier packet based on the packet priority of the tunneled packet before transmitting the carrier packet to a receiving device.

17. The receiving device of claim 11, wherein the receiving device is configured to:
- transmit a portion of the carrier packet to a receiving device before updating the packet priority of the carrier packet based on the packet priority of the tunneled packet, the portion including an indication of the packet priority of the carrier packet;
- set a value in a tail of the carrier packet to indicate the update to be made to the packet priority of the carrier packet based on the packet priority of the tunneled packet, the value in the tail of the carrier packet configured to cause the receiving device to update the packet priority of the carrier packet; and
- transmit, to the receiving device, the tail of the carrier packet along with any remaining portion of the carrier packet.

18. The receiving device of claim 11, wherein the receiving device is configured to:
- transmit a portion of the carrier packet to a receiving device before updating the packet priority of the carrier packet based on the packet priority of the tunneled packet, the portion including an indication of the packet priority of the carrier packet;
- set a value in a tail of the packet to indicate that receiving the carrier packet is to be aborted by the receiving device;
- transmit, to the receiving device, the tail of the carrier packet; and
- update the packet priority of the carrier packet based on the packet priority of the tunneled packet before retransmitting the carrier packet to the receiving device.

19. The receiving device of claim 11, wherein the receiving device is configured to:
- transmit a portion of the carrier packet to a receiving device before updating the packet priority of the carrier packet based on the packet priority of the tunneled packet, the portion including an indication of the packet priority of the carrier packet;
- transmit, to the receiving device, a control packet, the control packet indicating that receiving the carrier packet is to be aborted by the receiving device; and
- update the packet priority of the carrier packet based on the packet priority of the tunneled packet before retransmitting the carrier packet to the receiving device.

20. The receiving device of claim 11, wherein the tunneled packet includes an indication of the packet priority of the tunneled packet, the indication of the packet priority of the tunneled packet being incorporated in the payload of the carrier packet.

* * * * *